July 2, 1946.  A. A. GRIFFITH  2,403,176
BEARING
Filed Oct. 7, 1943
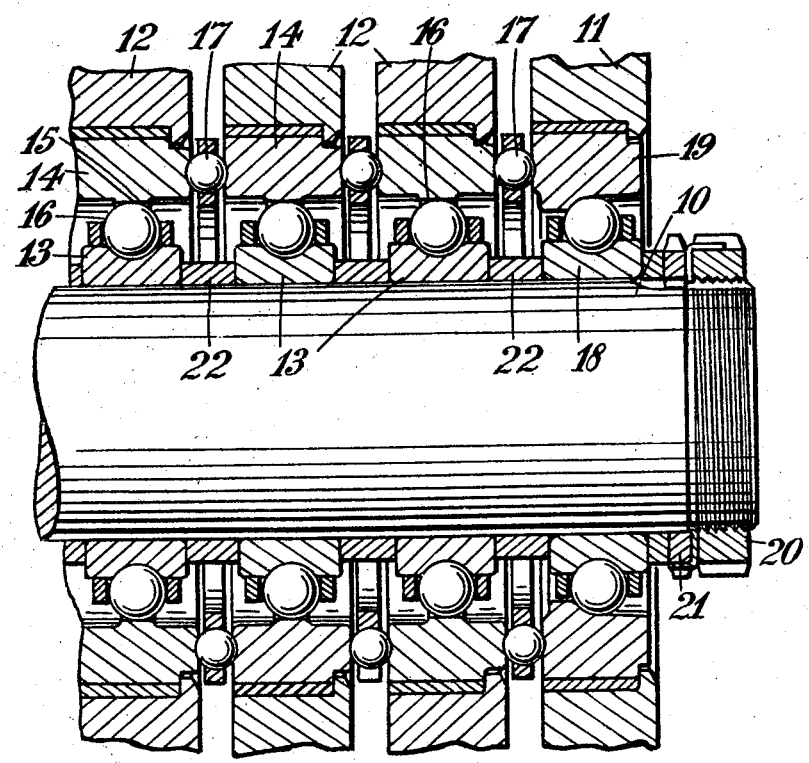
INVENTOR
Alan Arnold Griffith
BY Loyd Hall Sutton
ATTORNEY Patented July 2, 1946

2,403,176

UNITED STATES PATENT OFFICE 2,403,176

BEARING

Alan Arnold Griffith, Derby, England, assignor to Rolls-Royce Limited, Derby, England, a British company Application October 7, 1943, Serial No. 505,390
In Great Britain April 15, 1941

3 Claims. (Cl. 308—174)

This invention relates to bearings for a rotary power unit or compressor of the type comprising a plurality of rotor elements or discs which are separately rotatable on a shaft, including constructions in which alternate elements rotate in opposite directions. In the specification of British patent application No. 245/41 there is described an assemblage of bearings as above set forth comprising for each rotor element a combined radial and thrust bearing, with a thrust-bearing interposed between the adjacent rotor elements. According to the present invention a bearing-assemblage for a plurality of coaxial relatively rotatable rotors comprises a radial bearing for each rotor and thrust-bearings between adjacent rotors characterised in that the outer races of the radial bearings have plain cylindrical surfaces permitting slight axial movements, in combination with means for applying an axial loading to the complete assemblage. Preferably the thrust-bearings are engaged by races formed on the sides of the outer races of the radial bearings.

According to another feature of this invention the material of the shaft whereon the bearing-assemblage is mounted is selected to have a smaller co-efficient of thermal expansion than the bearings assembled on it.

According to yet another feature of this invention, the axial preloading aforesaid is applied by a nut screwed onto the shaft, through a combined radial- and thrust-bearing at the end of the assemblage, to the rotors and their interposed thrust bearings.

The accompanying drawing is a sectional elevation showing a preferred embodiment of this invention.

Referring to this drawing, the reference 10 indicates a shaft whereon there are mounted a plurality of rotor elements of which the end one is indicated at 11, and the others by the reference 12. These elements are required to rotate in opposite directions on the shaft, and when such a device is used, for example in an aircraft, it may be subjected to gyroscopic forces which, owing to the different directions of rotation, act in opposite directions on the alternate rotors and tend to twist them in opposite directions relative to the axis of the shaft. Whilst such gyroscopic forces can be taken by thrust-bearings between the rotor elements, it is desirable to provide for preloading these bearings, so that under all conditions of gyroscopic loading, the loading of the bearings will be always of the same sign and vary only in magnitude. For this purpose each of the rotors 12 is mounted on a radial or journal ball-bearing whereof the inner race 13 is of the usual construction, but the outer race 14 is formed with a plain cylindrical surface 15 to be engaged by the balls 16. With this arrangement, the radial bearings effect no axial constraint on the rotors. Between each pair of adjacent races 14 there is provided a ball thrust-bearing 17.

The rotor 11 at the end of the assemblage is provided with a combined radial and thrust-bearing, whereof the inner race is shown at 18 and the outer race at 19 these being of any known construction suitable for applying an end-thrust to the assemblage. Such end-thrust is applied by means of a nut 20 screwed onto the shaft 10 and engaging through suitable spacing-members 21 the inner race 18 of the bearing for the rotor 11, and additional spacing-members 22 are provided between the inner race for the remainder of the rotors as far as the other end one of the assemblage which may be located against a shoulder on the shaft or in any other convenient manner. The tightening of the nut 21 applies an axial thrust to the inner race 18 which is transmitted to its outer race 19 and thence to all the thrust-bearings 17, which in the example shown, are located between the outer races for the bearings for the respective rotor elements.

The material of the shaft 10 is selected to have a smaller co-efficient of thermal expansion than the assemblage of races on it, so that when a certain value of preloading is applied at an ordinary low atmospheric temperature, any increase of temperature increases the preloading owing to the differential expansion. In the case of a power-unit, this variation of preloading with temperature ensures the minimum of friction when starting up from cold and also an adequate preloading when the power-unit is running under its normal working conditions. There is no disadvantage in the reduced preloading during the starting period, since under normal circumstances the problem of the gyroscopic forces does not arise at that time, but it is rendered available before it is required when the aircraft is in flight. Another advantage of the construction above described, is that the preloading is applied directly to the thrust-bearings so that the friction of the inner journal-races 13 does not resist the preloading. Finally, it will be appreciated that the general construction is an extremely simple one for solving the problem of adequately supporting rotor elements arranged as above described.

I claim:

1. The combination of a shaft, a plurality of relatively rotatable co-axial rotors thereon, a radial anti-friction bearing for each rotor having the inner surface of its outer races of plain cylindrical form, spacing pieces between the inner races of said radial bearings, said shaft having a lower co-efficient of thermal expansion than the assemblage of inner races and spacing pieces on it, a plurality of axial thrust-bearings disposed respectively between the outer races of said radial bearings, and means for applying an axial loading to said rotors and thrust-bearings.

2. The combination of a shaft, a plurality of relatively rotatable co-axial rotors thereon, a radial anti-friction bearing for each rotor permitting axial movement thereof relatively to the shaft, a plurality of axial thrust-bearings disposed respectively between said rotors, a combined radial and thrust-bearing at one end of said plurality of rotors, and a nut screwed on said shaft to apply axial thrust to said last-mentioned bearing and through it to said rotors and thrust-bearings.

3. The combination of a shaft, a plurality of relatively rotatable co-axial rotors thereon, a radial anti-friction bearing for each rotor having the inner surface of its outer race of plain cylindrical form permitting axial movement thereof relatively to the shaft, spacing pieces between the inner races of said radial bearings, said shaft having a lower co-efficient of thermal expansion than the assemblage of inner races and spacing pieces on it, a plurality of axial thrust-bearings disposed between the outer races of said radial bearings, a shoulder on said shaft at one end of the assemblage of inner races and spacing members on it, a combined radial and thrust-bearing at the other end of said plurality of rotors and a nut screwed on said shaft to apply axial thrust to said last-mentioned bearing and through it to the assemblage of rotors on the shaft.

ALAN ARNOLD GRIFFITH